United States Patent [19]

Lawless

[11] Patent Number: 4,684,207

[45] Date of Patent: Aug. 4, 1987

[54] FIELD DEPENDENT ELECTROOPTIC DEVICE AND METHOD

[76] Inventor: William N. Lawless, c/o CeramPhysics, Inc., 921 Eastwind Dr., Suite 110, Westerville, Ohio 43081

[21] Appl. No.: 729,034

[22] Filed: Apr. 30, 1985

[51] Int. Cl.$^4$ .............................................. G02B 6/10
[52] U.S. Cl. ............................ 350/96.14; 350/96.13
[58] Field of Search ............... 350/96.11, 96.12, 96.13, 350/96.14, 96.34; 252/62.9; 501/137, 138

[56] References Cited

U.S. PATENT DOCUMENTS 4,099,836  7/1978  Baues et al. .................. 350/96.34 X

OTHER PUBLICATIONS

Physical Review Letters, vol. 19, No. 20, Nov. 13, 1967, pp. 1176-1179., Fleury et al., "Electric Field Dependence of Optical-Phonon Freq".
Physical Review, vol. 174, No. 2, Oct. 10, 1968, pp. 613-625, Fleury et al., "Electric-Field-Induced Roman Scattering--".
Ferroelectrics, pp. 142-154, 1983, "Integrated Optics Applications for Ferroelectric Materials".

*Primary Examiner*—Eugene R. LaRoche
*Assistant Examiner*—James C. Lee
*Attorney, Agent, or Firm*—Killworth, Gottman, Hagan & Schaeff

[57] ABSTRACT

Improved ferroelectric ceramic electrooptical substrate materials are provided for use in electrooptic devices utilizing millimeter wavelengths. The ferroelectric ceramics are characterized by transition temperatures in the range of 50-90 K and are selected from the following families of compositions: (1) $(Ba_xSr_{1-x})TiO_3$, and (2) $(Pb_yCd_{1-y})_2(Ta_zNb_{1-z})_2O_7$; where x is greater than 0 and less than 1, and y and z are numbers in the range of from 0 to 1.

14 Claims, 5 Drawing Figures

FIELD DEPENDENT ELECTROOPTIC DEVICE AND METHOD

BACKGROUND OF THE INVENTION

This invention relates to ceramic compositions for use in electrooptic devices and, more particularly, to ferroelectric ceramic compositions having optical properties which are useful at millimeter wavelengths.

In the visible and near-infrared spectral region, the refractive index of materials can easily and efficiently be altered by the electrooptic or Kerr effect, most notably in ferroelectrics and liquid crystals. Examples of such materials include the so-called PLZT transparent ferroelectric ceramics in which the applications of an electric field alters the polarization state and thereby also the birefringence of the materials. Utilizing these electrooptic effects, a variety of operations can be performed on guided light beams including modulation, switching, beam deflection, frequency shifting or mixing, and the like. To date, the most popular ferroelectric material for these electrooptic applications has been lithium niobate.

At millimeter wavelengths, however, attempts to develop similar electrooptic effects in solids have met with disappointment. A basic reason for this can be explained by the lattice dynamics of solids. Optic-mode frequencies in solids are electric-field dependent, and in the visible and near-infrared spectral region, light frequencies (approximately $10^{15}$ Hz) are commensurate with the optic-mode frequencies usually found in solids. For millimeter wavelengths, however, the frequencies involved (approximately $10^{12}$ Hz) are in the range of acoustic modes in solids. These acoustic modes are unaffected by electric fields. Thus, the search for electrooptic effects at millimeter wavelengths has focused on considering materials having ultra-low frequency optic modes.

In many instances, ferroelectric transitions are characterized by a temperature-dependent optic mode whose frequency ($\omega_s$) can be very low (approximately $10^{12}$ Hz). This soft mode frequency is proportional to $(T-T_o)^{\frac{1}{2}}$ in the paraelectric phase of the material where $T > T_o$ and $T_o$ is the transition temperature between paraelectric and ferroelectric phases. It is this temperature dependence that causes $\omega_s$ to achieve such small values.

However, several problems present themselves for these ferroelectric materials. On the one hand, in ferroelectric materials with $T_o$ near room temperature, the soft mode is usually over-damped by optoacoustic interactions, among other things, and thus is not electric field controllable. On the other hand, ferroelectric materials with under-damped soft modes are limited to inconveniently low temperatures. For example, the electric-field dependence of the soft-mode frequencies in $KaTaO_3$ and $SrTiO_3$ have been measured at low temperatures by induced Raman scattering by Fleury and Worlock. *Phys. Rev. B*174, 613 (1968). It was found in these materials that an electric field of approximately 10 kilovolts per centimeter (10 kV/cm) increased $\omega_s$ from 0.3 to 1.5 THz (i.e., 0.3 to 1.5 $10^{12}$ Hz) at 8K. However, at temperatures above 40K, the effect of the electric field on $\omega_s$ was practically negligible. Finally, from a practical point of view, the operating temperature must be very stable so that changes in $\omega_s$, which is temperature dependent, come about as a result of changes in the electric field rather than from temperature variations.

Accordingly, the need exists in this art for material and devices having useful electrooptical properties at millimeter wavelengths, but not at inconveniently low temperatures.

SUMMARY OF THE INVENTION

The present invention provides ferroelectric ceramic materials which are useful in conjunction with electrooptical devices utilizing millimeter wavelengths. According to one aspect of the present invention, an electrooptic device and method of operation are provided which alter the refractive index of an electrooptic substrate material by the application of an electric field. The electrooptic substrate material is a ferroelectric ceramic selected from the group consisting of $(Ba_xSr_{1-x})TiO_3$ and $(Pb_yCd_{1-y})_2(Ta_zNb_{1-z})_2O_7$, where x is greater than 0 and less than 1, and y and z are numbers in the range of from 0 to 1.

The electrooptic device can be any of a number of different devices which utilize an electrooptic substrate material to guide one or more light beams. For example, the electrooptic device may modulate, switch or deflect light beams, may shift or mix different frequencies, or may convert analog information to digital information. In all such devices, an electric field is applied to the electrooptic substrate material to alter its optical characteristics.

The titanates and lead-cadmium niobates and tantalates of the present invention have adjustable paraelectric to ferroelectric transition temperatures ($T_o$) in the range of 50–90K, and preferably near the boiling point of liquid nitrogen at 77.4K, or alternatively, of liquid oxygen for space applications. This, coupled with their under damped soft-mode frequencies at millimeter wavelengths in this temperature range result in electric field-controllable electrooptic effects which are useful in electrooptic devices.

Finally, the ferroelectric ceramics of the present invention can readily be formed into multilayer capacitor structures which, at the cryogenic temperature ranges utilized, are able to withstand electric field strengths in the range of 200–300 kV/cm without dielectric breakdown. Thus, the electrooptic substrate material may be formed as the dielectric layer or layers of a capacitor and the electric field applied to the material by electrodes positioned on either side of the substrate.

Accordingly, it is an object of the present invention to provide an improved electrooptic substrate material for use in electrooptic devices operating at millimeter wavelengths. This, and other objects and advantages of the invention, will become apparent from the following detailed description, the accompanying drawings, and the appended claims.

DESCRIPTION OF THE PREFERRED EMBODIMENTS

Figure 1:
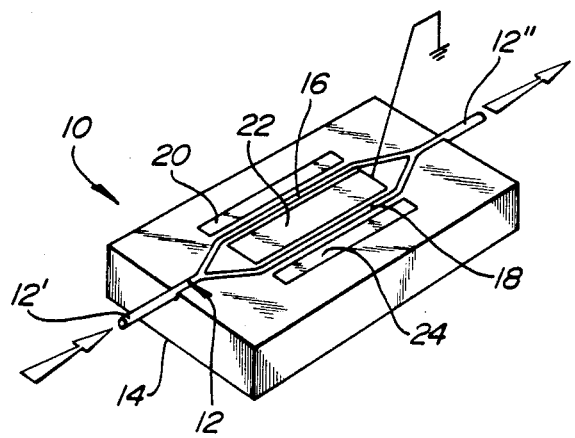
FIG. 1 is a schematic diagram of a typical electrooptic modulator utilizing an electrooptic substrate.
Figure 2:
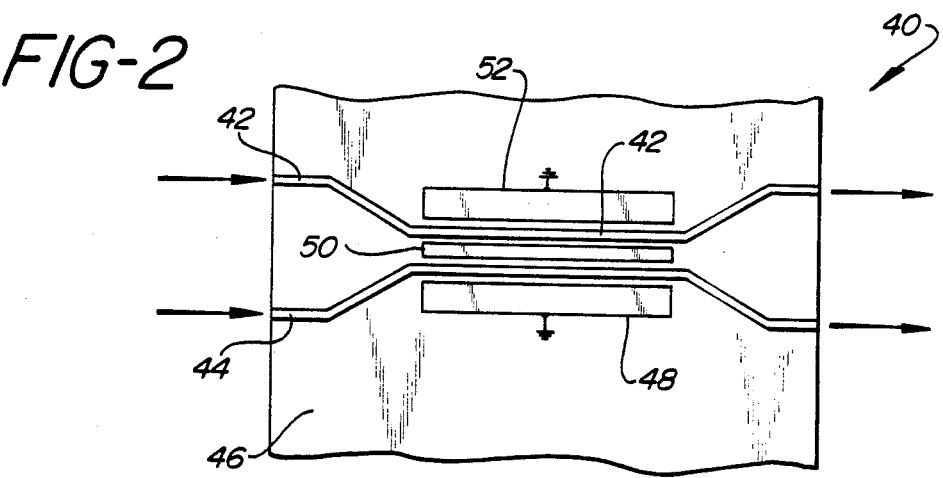
FIG. 2 is a schematic diagram of a typical electrooptic switch utilizing an electrooptic substrate.

The ferroelectric ceramic materials of the present invention find use as electrooptical substrate materials in a number of different electrooptic devices. FIGS. 1 and 2 illustrate typical applications. As shown in FIG. 1, an interferometric electrooptic modulator 10 converts polarized light input to modulated light output. A waveguide 12, having an inlet leg 12' and an outlet leg 12", located in electrooptic substrate 14, splits a polarized light input into two branches 16 and 18. An electric field is applied across electrodes 20, 22, and 24. By varying the electric field, the soft mode frequency, $\omega_s$, of the ferroelectric ceramic material varies, as well as its refractive index. The two distinct (orthogonal) light waves in branches 16 and 18 of waveguide 12 thus undergo a phase modulation which is converted to an intensity modulation when the waves are recombined in outlet leg 12". A suitable cooling means (not shown) maintains the substrate 14 within the desired temperature range. Such cryogenic cooling devices are known in the art.

Another typical electrooptic device, a coupled waveguide electrooptic switch, is shown in FIG. 2. In switch 40, closely spaced, parallel waveguides 42, 44 run through electrooptic substrate material 46. An electric field is applied across electrodes 48, 50 and 52.

In operation, light is injected synchronously into adjacent waveguides 42 and 44. The applied electric field varies the soft mode frequency, $\omega_s$, and the refractive index of the electrooptical substrate to change destroying the synchronism. Thus, by controlling the applied electric field, the refractive index increases in one waveguide and decreases in the adjacent one such that switch 40 can be used as a binary device which can be set for straight-through or crossover operation. A suitable cooling means (not shown) maintains substrate 46 within the desired temperature range.

As the electrooptic substrate material, the present invention utilizes strontium-barium titanates and lead-cadmium niobates and tantalates which have adjustable paraelectric to ferroelectric transition temperatures ($T_o$) in the range of 50–90K. These ferroelectric ceramic materials have been found to exhibit soft-mode behavior at millimeter wavelengths (frequencies of approximately $10^{12}$ Hz) in this temperature range. Thus, these materials provide controllable electrooptic effects by the application of an electric field.

Preferably, the ferroelectric ceramic materials of the present invention are utilized in a device which is maintained at or near the boiling point of liquid nitrogen at 77.4K. This is because of the fact that liquid nitrogen is readily available, relatively inexpensive, has a large latent heat, and is widely accepted for use. Several compositions having transition temperatures ($T_o$) somewhat below the liquid nitrogen boiling point can be formed from the two ferrelectric ceramic composition families of the present invention, namely, $(Ba_xSr_{1-x})TiO_3$ and $(Pb_yCd_{1-y})_2(Ta_zNb_{1-z})_2O_7$. For these ceramic families, compositions having transition temperatures of approximately 70K can be formed, for example, with a titanate composition where $x=0.06$, with a mixed lead-cadmium niobate composition where $y=0.17$ and $z=0$, or with a cadmium tantalate-niobate composition where $y=0$ and $z=0.35$.

Another aspect of the present invention is that the ferroelectric ceramic materials may be utilized as the dieletric material in a multilayer capacitor structure. Single crystals or bulk ceramic materials typically can withstand electric field strengths of only approximately 10–20 kV/cm before dielectric breakdown occurs. If the range of applied electric fields is limited, then the change in electrooptical properties over a given frequency range is correspondingly limited.

However, by utilizing the ferroelectric ceramic materials of the present invention in capacitor structures, dielectric withstanding strengths of approximately 200 kV/cm can be achieved at liquid nitrogen temperatures. The ceramic materials of the present invention can be formed into a multilayered ceramic capacitor utilizing tape casting techniques known in the art. "Tape casting" refers to the known procedures for forming a multilayered body having appropriate metal electrodes interdispersed between ceramic layers. Such ceramic layers may be formed by mixing powdered ceramic material with an appropriate organic binder and preparing a thin film sheet. The sheets may be stacked and pressed in a known manner followed by binder burnout and sintering.

For a typical procedure, calcined ceramic powders are cast into sheets about 0.001–0.010 inch thick using any one of several available organic binders. After stacking with appropriate, silk-screened electrode patterns, the stacks are pressed and fired according to the following schedule: the organic binder is burned out at 400°–500° C. for 1–5 hours, followed by sintering of the sheets at 1200°–1400° C. for 1–24 hours. Optionally, pressure may be applied to the sheets during the sintering step.

Figure 3:
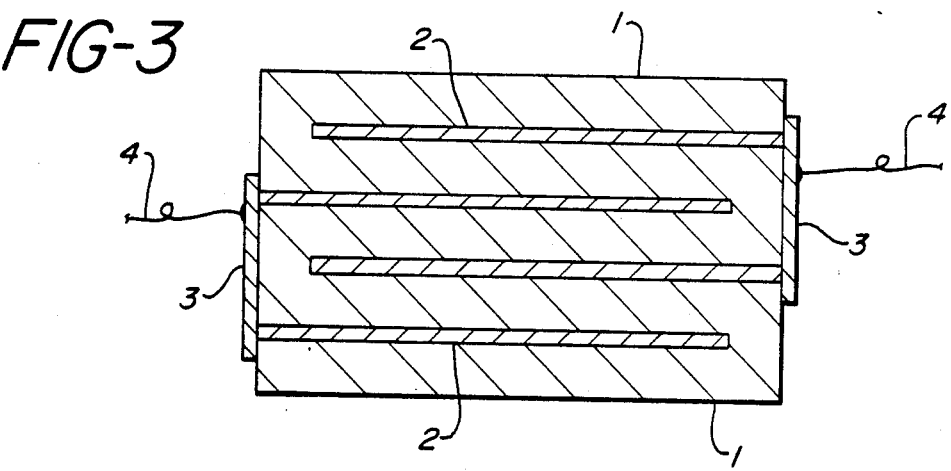
FIG. 3 is a cross-sectional view of a multilayer capacitor fabricated of the ferroelectric ceramic materials used in the present invention.

A typical capacitor structure utilizing the ferroelectric ceramic materials of the present invention is illustrated in FIG. 3. The multilayer capacitor comprises ceramic layers 1 with interleafing metal electrodes 2. Metal caps 3 make electrical contact to the electrodes 2 and to the hook-up wires 4. While the device illustrated in FIG. 3 is shown with only a few layers for simplicity and ease of understanding, it will be apparent to those skilled in the art that many more layers may be built up in accordance with these teachings to form more complex multilayered capacitors which can be incorporated into electrooptical devices.

A ferrelectric ceramic material of the present invention was fabricated into a multilayer capacitor to test its behavior and provide a model for expected behavior as an electrooptical substrate material. A mixed cadmium-lead niobate having the composition $(Cd_{0.83}Pb_{0.17})_2Nb_2O_7$ and a transition temperature ($T_o$) of 71K was fabricated into a multilayer capacitor in accordance with the techniques described above.

Figure 4:
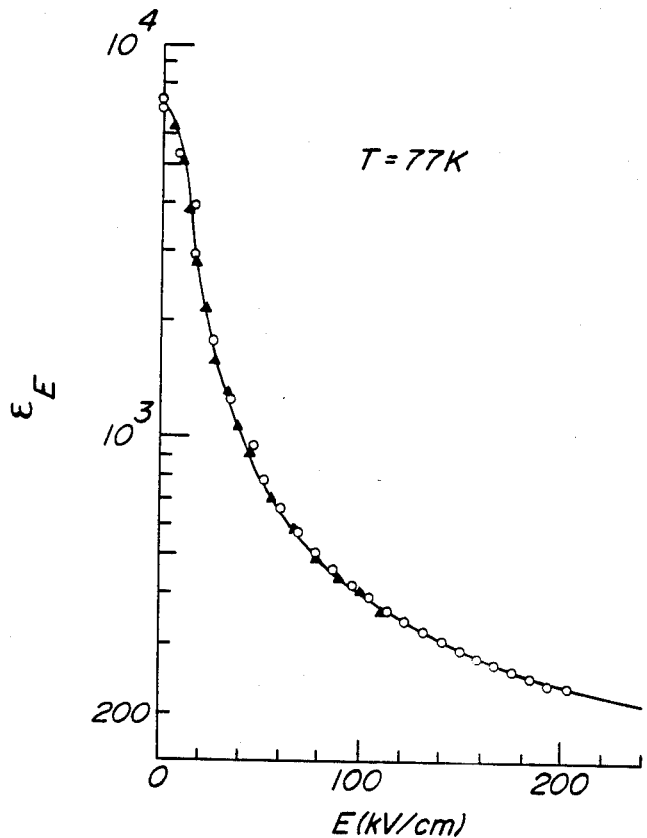
FIG. 4 is a graph of dielectric constant versus ceramic composition at 77K.

The electric field dependence of the dielectric constant was measured and the results are illustrated by the graph in FIG. 4. As shown, at 77K the field-dependent dielectric constant rapidly dropped to a temperature independent value of approximately 200 for electric field strengths of approximately 200 kV/cm. Other parameters were also measured, and it was determined that the zero-field dielectric constant, $\epsilon_o$, was independent of frequency ($\pm 0.3\%$) to 100KHz at 77K; that $\epsilon_o$ followed a Curie-Weiss behavior at higher temperatures; the loss tangent in the paraelectric phase was approximately $10^{-4}$–$10^{-3}$ (1 KHz); and that the electric field dielectric data at and above 77K were perfectly reversible indicating a lack of hysteresis effects.

A model for estimating the soft-mode frequency behavior of the cadmium-lead niobate can be constructed from the Curie-Weiss relation $$\epsilon = \epsilon_\infty + C/(T - T_o) \quad \text{(Eq. 1)}$$

which, when combined with the Lyddane-Sachs-Teller relation, $\omega_s \alpha (T - T_o)^{\frac{1}{2}}$, yields:

$$\omega_s = \alpha(\epsilon_E - \epsilon_\infty)^{-\frac{1}{2}}. \quad \text{(Eq. 2)}$$

where $\omega_s$ is the soft-mode frequency, $\alpha$ is a constant of proportionality, $\epsilon_E$ is the electric field dielectric constant, and $\epsilon_\infty$ is the dielectric constant at infinite temperature.

For purposes of this model, the limiting value of the soft-mode frequency (i.e., the value of $\omega_s$ at $E=0$) has been estimated at 15 cm$^{-1}$ at 77K. This estimation is based on measured values of 22 and 11 cm$^{-1}$, respectively, for the ferroelectric ceramics KTaO$_3$ and SrTiO$_3$. By inserting this value for $\omega_s$ and the measured values of $\epsilon_o = 7000$ and $\epsilon_\infty = 200$ into Eq. 2, the value of $\alpha$ may be determined.

Figure 5:
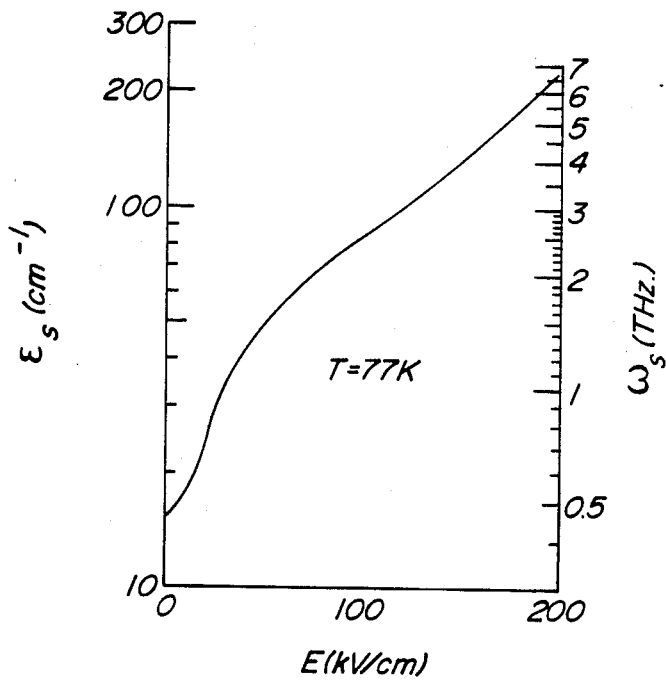
FIG. 5 is a graph of estimated soft-mode frequency versus electric field strength for a lead-cadmium niobate ceramic composition at 77K.

Using the $\epsilon_E$ measured values from FIG. 4, the estimated $\omega_s$ values versus electric field strength have been shown by the graph of FIG. 5. As can be seen, at 77K, $\omega_s$ increases by an order of magnitude between $E=0$ and $E=200$ kV/cm. This conclusion is substantially unaffected by the assignment of $\omega_s = 15$ cm$^{-1}$ at $E=0$. For comparison purposes, $\omega_s$ for SrTiO$_3$ and KTaO$_3$ changes rapidly with E at 10K (Fleury et al, *Phys. Rev.* B174, 613 (1968); *Phys. Rev. Lett.* 19, 1176 (1967)), but at higher temperatures in the range of 50-70K, the change in $\omega_s$ with changing electric field is practically negligible.

While the methods and apparatus herein described constitute preferred embodiments of the invention, it is to be understood that the invention is not limited to these precise methods and apparatus, and that changes may be made in either without departing from the scope of the invention, which is defined in the appended claims.

What is claimed is:

1. In an electrooptic device operating at millimeter wavelengths which alters the refractive index of an electrooptic substrate material by application of an electric field, the improvement comprising: as the electrooptic substrate material, a ferroelectric ceramic selected from the group consisting of (Ba$_x$Sr$_{1-x}$)TiO$_3$ and (Pb$_y$Cd$_{1-y}$)$_2$(Ta$_z$Nb$_{1-z}$)$_2$O$_7$, where x is greater than 0 and less than 1, and y and z are numbers in the range of from 0 to 1, said ceramic having a transition temperature, $T_o$, in the range of from 50-90K.

2. The electrooptic device of claim 1 in which x is between 0.04 and 0.08.

3. The electrooptic device of claim 1 in which x is between 0.12 and 0.20.

4. The electrooptic device of claim 1 in which the ceramic is (Ba$_x$Sr$_{1-x}$)TiO$_3$ and x=0.06.

5. The electrooptic device of claim 1 in which the ceramic is (Pb$_y$Cd$_{1-y}$)$_2$(Ta$_z$Nb$_{1-z}$)$_2$O$_7$ and y=0.17 and z=0.

6. The electrooptic device of claim 1 in which the ceramic is (Pb$_y$Cd$_{1-y}$)$_2$(Ta$_z$Nb$_{1-z}$)$_2$O$_7$ and y=0 and z=0.35.

7. The electrooptic device of claim 1 in which said ceramic forms the dielectric layer between two electrodes in said device.

8. The electrooptic device of claim 7 in which said ceramic forms the dielectric layers in a multilayer capacitor in said device.

9. In a method of operating an electrooptic device including the step of applying an electric field to said device to alter the refractive index of an electrooptic substrate material which transmits lightwaves, the improvement comprising: operating said device at a temperature of from 50-90K using a millimeter wavelength source of light and using as the electrooptic substrate material, a ferroelectric ceramic selected from the group consisting of (Ba$_x$Sr$_{1-x}$)TiO$_3$ and (Pb$_y$Cd$_{1-y}$)$_2$(Ta$_z$Nb$_{1-z}$)$_2$O$_7$, where x is greater than 0 and less than 1 and y and z are numbers in the range from 0 to 1.

10. The method of claim 9 in which the operating temperature is 70K.

11. The method of claim 10 in which the ceramic is (Ba$_x$Sr$_{1-x}$)TiO$_3$ and x=0.06.

12. The method of claim 10 in which the ceramic is (Pb$_y$Cd$_{1-y}$)$_2$(Ta$_z$Nb$_{1-z}$)$_2$O$_7$ and y=0.17 and z=0.

13. The method of claim 10 in which the ceramic is (Pb$_y$Cd$_{1-y}$)$_2$(Ta$_z$Nb$_{1-z}$)$_2$O$_7$ and y=0 and z=0.35.

14. The method of claim 9 in which the transition temperature, $T_o$, of said ceramic is at or below the operating temperature of said device.

* * * * *